(12) United States Patent
Yamazaki et al.

(10) Patent No.: US 8,326,916 B2
(45) Date of Patent: Dec. 4, 2012

(54) RELAY METHOD, RELAY APPARATUS, AND COMPUTER PRODUCT

(75) Inventors: Takeshi Yamazaki, Kawasaki (JP); Toshio Ishitobi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1107 days.

(21) Appl. No.: 11/158,687

(22) Filed: Jun. 22, 2005

(65) Prior Publication Data

US 2006/0174012 A1  Aug. 3, 2006

(30) Foreign Application Priority Data

Feb. 1, 2005 (JP) .................................. 2005-025204

(51) Int. Cl.
*G06F 15/16* (2006.01)
(52) U.S. Cl. ........ 709/203; 709/223; 709/224; 715/733; 715/734; 715/736
(58) Field of Classification Search .................. 709/203, 709/220, 223, 224, 225; 715/733, 734, 736
See application file for complete search history.

(56) References Cited

U.S. PATENT DOCUMENTS

| | | | | |
|---|---|---|---|---|
| 4,930,122 | A * | 5/1990 | Takahashi et al. ............. | 370/473 |
| 6,182,139 | B1 * | 1/2001 | Brendel .......................... | 709/226 |
| 6,854,072 | B1 * | 2/2005 | Cagle et al. ..................... | 714/15 |
| RE39,454 | E * | 1/2007 | Cantoni et al. ................. | 370/473 |
| 7,216,164 | B1 * | 5/2007 | Whitmore et al. ............. | 709/224 |
| 7,519,048 | B2 | 4/2009 | Kobayashi | |
| 7,590,715 | B1 * | 9/2009 | Raanan .......................... | 709/223 |
| 8,028,056 | B1 * | 9/2011 | Krishna et al. ................ | 709/223 |
| 2003/0028624 | A1 * | 2/2003 | Hasan et al. ................... | 709/220 |
| 2006/0143498 | A1 * | 6/2006 | Hatasaki et al. ................. | 714/4 |
| 2007/0110046 | A1 * | 5/2007 | Farrell et al. .................. | 370/389 |
| 2010/0211678 | A1 * | 8/2010 | McDysan et al. ............. | 709/225 |

FOREIGN PATENT DOCUMENTS

| | | |
|---|---|---|
| JP | 2002-261792 A | 9/2002 |
| JP | 2003-228527 A | 8/2003 |
| JP | 2003-256297 | 9/2003 |
| JP | 2004-227534 | 8/2004 |

OTHER PUBLICATIONS

RFC 1122 "Requirements for Internet Hosts—Communication Layers" Internet Engineering Task Force Oct 1989.*

* cited by examiner

*Primary Examiner* — Thu Ha Nguyen
(74) *Attorney, Agent, or Firm* — Fujitsu Patent Center (57) ABSTRACT

A relay apparatus for relaying a communication between a client and a server includes a determining unit that determines, when the server is to be switched to a standby server, whether connection in an application layer established between the server and the client can be maintained, without depending on an application; and an executing unit that executes a process depending on a result of determination by the determining unit. The process includes a maintaining process for maintaining the connection when the determining unit determines that the connection can be maintained; and a disconnecting process for disconnecting the connection when the determining unit determines that the connection cannot be maintained.

10 Claims, 11 Drawing Sheets

310 CONFIGURATION-
DEFINITION SETTING TABLE

| INTERFACE | ADDRESS/MASK LENGTH |
|---|---|
| eth0 | 10.1.1.1/24 |
| eth1 | 10.1.2.1/24 |
| eth2 | 10.1.3.1/24 |

FIG.4B

320 ALLOCATION SETTING TABLE

| REPRESENTATIVE IP ADDRESS/MASK LENGTH | REPRESENTATIVE PORT NUMBER | MESSAGE-IDENTIFICATION POLICY NAME | SV GATEWAY ADDRESS/MASK LENGTH | HOST NAME | SV IP ADDRESS | SV PORT NUMBER | SERVER TYPE |
|---|---|---|---|---|---|---|---|
| 10.1.1.1/24 | 30 | POL#1 | 10.1.2.1/24 | SV#1 | 10.1.2.11 | 32 | MAIN |
| | | | | SV#2 | 10.1.2.12 | 64 | STANDBY |

FIG.4C

| MESSAGE-IDENTIFICATION POLICY NAME | MESSAGE-LENGTH FIELD TYPE | MESSAGE-LENGTH HEAD IDENTIFICATION | MESSAGE-LENGTH END IDENTIFICATION | MESSAGE-LENGTH FIELD TYPE | MESSAGE-ID FIELD TYPE | MESSAGE-ID HEAD IDENTIFICATION | MESSAGE-ID END IDENTIFICATION | MESSAGE-ID CHECK METHOD | TRANSMISSION CONFIRMATION | PACKET CHECK DIRECTION | MEASURE | LOG LEVEL |
|---|---|---|---|---|---|---|---|---|---|---|---|---|
| POL#0 | FIXED | MESSAGE OFFSET: 1 BYTE CHARACTER STRING: "LENGTH:" | MESSAGE OFFSET: 5 BYTE CHARACTER STRING: "¥R¥N" | UNSIGNED INT | FIXED | MESSAGE OFFSET: 6 BYTE CHARACTER STRING: "ID:" | MESSAGE OFFSET: 7 BYTE CHARACTER STRING: "¥R¥N" | COINCIDE WITH NORMAL EXPRESSION CHARACTER STRING "XML.+" | YES | BOTH DIRECTIONS (TRANSMISSION AND RECEPTION SIDES) | PASS | DETAILS |
| POL#0 | VARIABLE | | | CHARACTER STRING | VARIABLE | | | ID FIELD SHIFTS IN ORDER OF "001", "002", "003", AND "004" | YES | RECEPTION SIDE | RST TRANSMISSION | OUTLINE |

330 MESSAGE IDENTIFICATION TABLE

FIG.5

130 CONNECTION MANAGEMENT TABLE

CL SIDE

| CL IP ADDRESS | CL PORT NUMBER | REPRESENTATIVE IP ADDRESS | REPRESENTATIVE PORT NUMBER | SEQUENCE NUMBER | TRANSMITTED /RECEIVED MESSAGE LENGTH (BYTE) | MESSAGE LENGTH (BYTE) 231 | MESSAGE ID 232 |
|---|---|---|---|---|---|---|---|
| 10.2.1.158 | 100 | 10.1.1.1 | 30 | 45589528 | 5 | 58 | 1 |
| 10.2.1.15 | 108 | 10.1.1.1 | 30 | 56742 | 154 | - | 10 |
| 10.2.1.108 | 135 | 10.1.1.1 | 30 | 987415868 | 320 | 338 | 2 |
| ... | ... | ... | ... | ... | ... | ... | ... |

SV SIDE

| SV IP ADDRESS | SV PORT NUMBER | SEQUENCE NUMBER | SEQUENCE NUMBER OFFSET | TRANSMITTED /RECEIVED MESSAGE LENGTH (BYTE) | MESSAGE LENGTH (BYTE) 231 | MESSAGE ID 232 |
|---|---|---|---|---|---|---|
| 10.1.2.11 | 32 | 357149963 | 105248356 | 0 | - | 100 |
| 10.1.2.11 | 32 | 9778510038 | 0 | 160 | 880 | 110 |
| 10.1.2.11 | 32 | 841 | 745447124 | 304 | - | 95 |
| ... | ... | ... | ... | ... | ... | ... |

FIG.10

RELAY METHOD, RELAY APPARATUS, AND COMPUTER PRODUCT

BACKGROUND OF THE INVENTION

1. Field of the Invention

The present invention relates to a relay method, a relay apparatus, and a computer product for relaying a communication between a client and a server.

2. Description of the Related Art

Conventionally, in a system in which a server provides service to a client via a network, in addition to a main server that provides the service, a standby server that operates as an alternative machine of the main server when a fault occurs in the main server, and a relay apparatus that relays a communication between the server and the client are provided for a purpose of improving reliability of the system.

When a fault occurs in the main server, the relay apparatus performs a fault recovery processing. In the fault recovery processing, the relay apparatus switches a working server from the main server to the standby server, thereby continuing provision of the service in the system (for example, see Japanese Patent Application Laid-Open No. 2003-256297).

However, the relay apparatus relays a communication between the client and the server in an application layer. Therefore, at the time of switching the working server to the standby server, a determination on whether connection in the application layer can be maintained depends on an application. Consequently, a general fault recovery independent from the application cannot be performed.

Therefore, in a conventional relay apparatus, an independent fault recovery processing performed by the relay apparatus is required to be developed for each application. Since the relay between the client and the server is carried out in the application layer, a load of relay processing is large compared to when the relay is carried out in a transmission control protocol (TCP) layer.

SUMMARY OF THE INVENTION

It is an object of the present invention to at least solve the problems in the conventional technology.

A computer-readable recording medium according to one aspect of the present invention stores a relay program for relaying a communication between a client and a server, the relay program making a computer execute determining, when the server is to be switched to a standby server, whether connection in an application layer established between the server and the client can be maintained, without depending on an application; and executing a process depending on a result of determination at the determining. The process includes maintaining the connection when it is determined that the connection can be maintained; and disconnecting the connection when it is determined that the connection cannot be maintained.

A computer-readable recording medium according to another aspect of the present invention stores a relay program for a relay apparatus that relays a communication between a client and a server, the relay apparatus including a first computer currently activated and a second computer being an alternative computer when the first computer becomes inactivated, the relay program making the second computer execute determining, when the server is to be switched to a standby server, whether connection in an application layer established between the server and the client can be maintained, without depending on an application; and executing a process depending on a result of determination at the determining. The process includes maintaining the connection when it is determined that the connection can be maintained; and disconnecting the connection when it is determined that the connection cannot be maintained.

A relay method according to still another aspect of the present invention is for relaying a communication between a client and a server, and includes determining, when the server is to be switched to a standby server, whether connection in an application layer established between the server and the client can be maintained, without depending on an application; and executing a process depending on a result of determination at the determining. The process includes maintaining the connection when it is determined that the connection can be maintained; and disconnecting the connection when it is determined that the connection cannot be maintained.

A relay apparatus according to still another aspect of the present invention is for relaying a communication between a client and a server, and includes a determining unit that determines, when the server is to be switched to a standby server, whether connection in an application layer established between the server and the client can be maintained, without depending on an application; and an executing unit that executes a process depending on a result of determination by the determining unit. The process includes a maintaining process for maintaining the connection when the determining unit determines that the connection can be maintained; and a disconnecting process for disconnecting the connection when the determining unit determines that the connection cannot be maintained.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Exemplary embodiments of the present invention will be explained in detail below with reference to the accompanying drawings.

Figure 1:
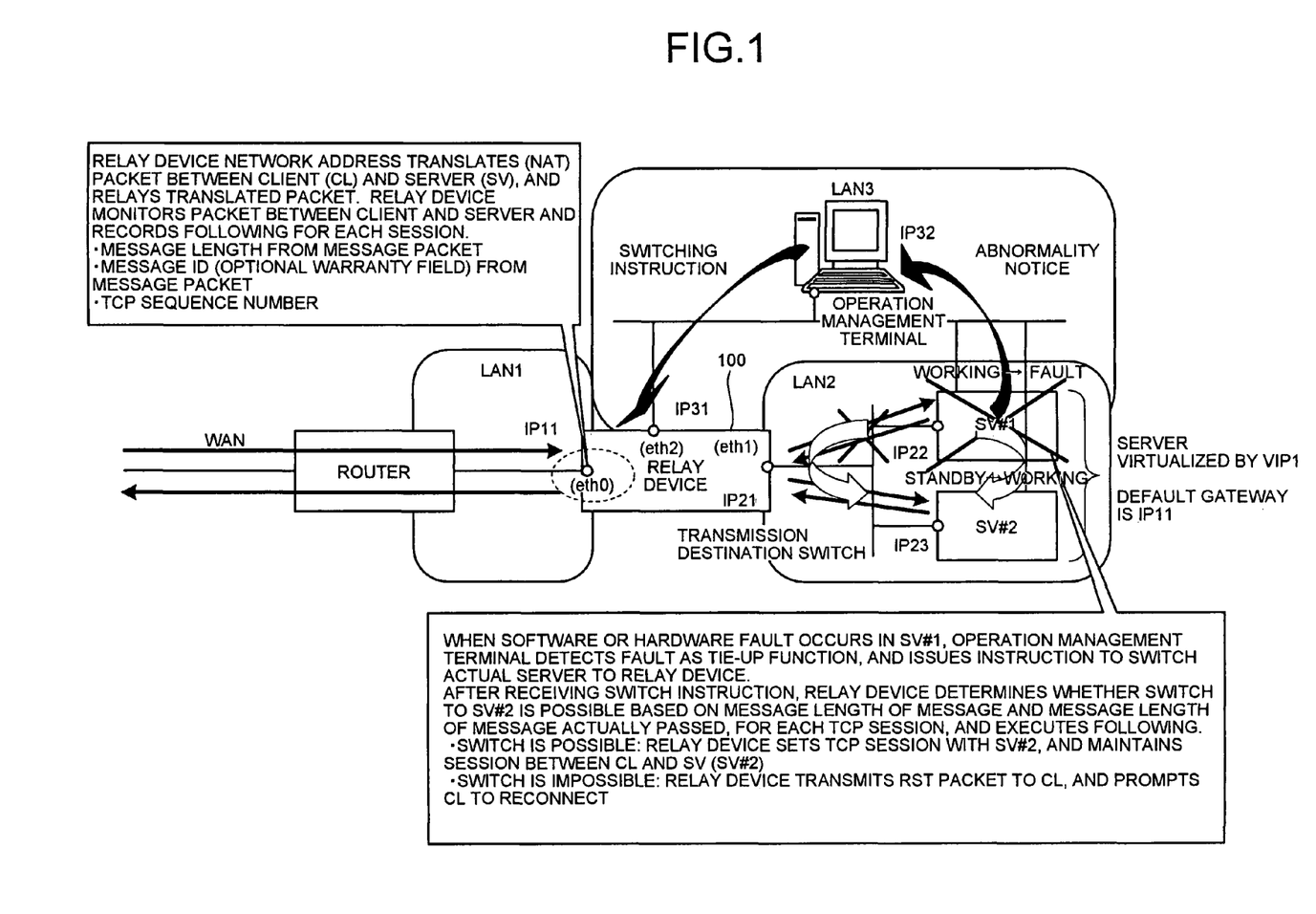
FIG. 1 is a schematic for explaining a concept of a fault recovery processing performed by a relay apparatus according to an embodiment of the present invention.

FIG. 1 is a schematic for explaining a concept of a fault recovery processing performed by a relay apparatus according to an embodiment of the present invention. As shown in FIG. 1, a server system includes a main server (SV#1), a standby server (SV#2), and a relay apparatus 100. The relay apparatus 100 is connected to a router via a local area network (LAN) 1. The main server and the standby server are connected to the relay apparatus 100 via a LAN 2. The relay apparatus 100, the main server, and the standby server are connected to an operation management terminal via a LAN 3.

The operation management terminal detects a fault that occurs in the main server, and instructs the relay apparatus 100 to switch a working server from the main server to the standby server. The router is connected to a client via a wide area network (WAN).

The relay apparatus 100 relays a packet between the client (CL) and the server (SV) by network address translation (NAT). The relay apparatus 100 monitors a packet communicated between the client and the server for each TCP session as connection in an application layer, and extracts, from a message packet, information such as a message length, a message identification (ID), and a TCP sequence number, and records the information.

When software or hardware fault occurs in the main server, the operation management terminal instructs the relay apparatus 100 to switch the working server from the main server to the standby server. The relay apparatus 100 determines whether a switch to the standby server without interrupting a TCP session is possible based on the message length. Specifically, the relay apparatus 100 determines whether the switch to the standby server without interrupting the TCP session is possible based on the message length in the message packet and a length of a message actually communicated.

When it is determined that the switch without interrupting the TCP session is possible, the relay apparatus 100 sets up a TCP session with the standby server, thereby performing a session maintaining processing for maintaining the TCP session between the client and the server. On the other hand, when it is determined that the switch without interrupting the TCP session is not possible, the relay apparatus 100 transmits a reset (RST) packet to the client, thereby performing a session disconnecting processing for requesting the client to establish connection again.

As explained above, according to the present embodiment, the relay apparatus 100 monitors the packet between the client and the server, and records the message length and the like for each TCP session. When the relay apparatus 100 is instructed from the operation management terminal to switch the working server from the main server to the standby server, the relay apparatus 100 determines whether the switch to the standby server without interrupting the TCP session is possible, based on the message length. Thus, the relay apparatus 100 can switch the working server by properly maintaining or disconnecting the TCP session, without depending on an application.

Figure 2:
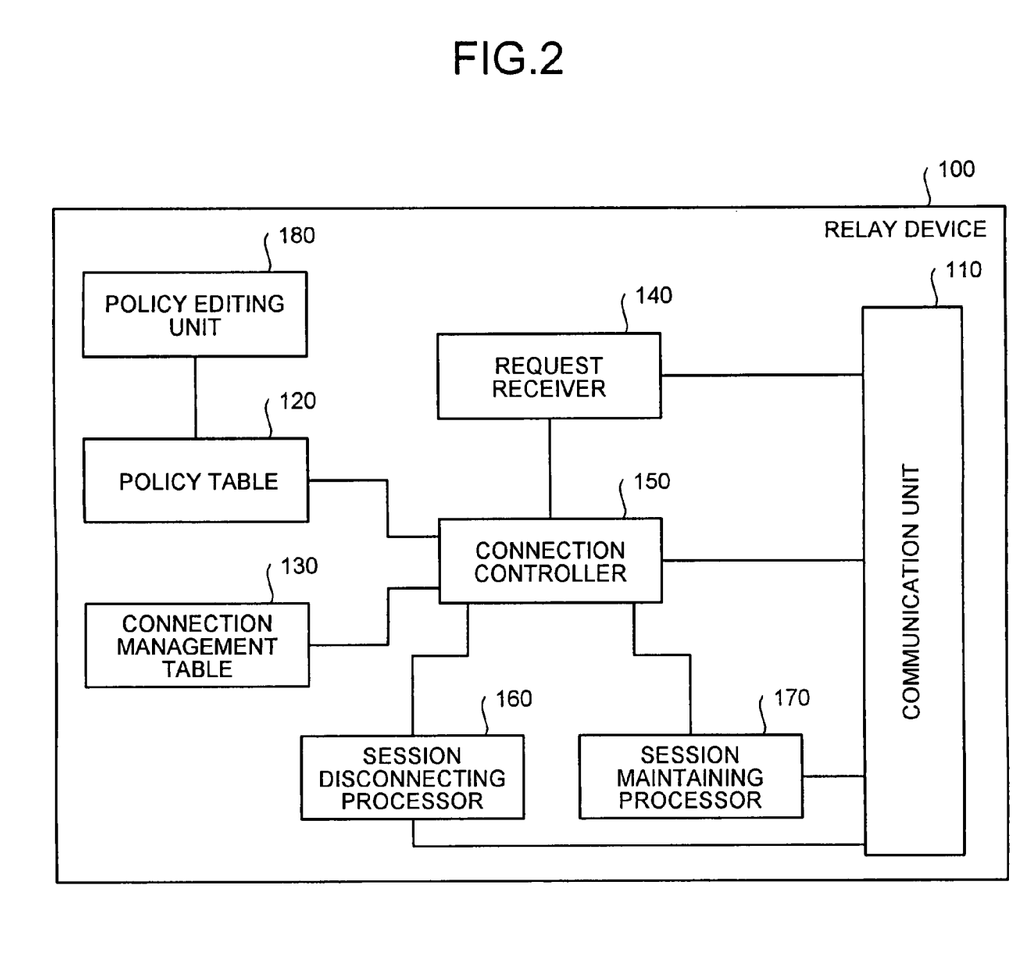
FIG. 2 is a block diagram of the relay apparatus.

FIG. 2 is a block diagram of the relay apparatus 100. As shown in FIG. 2, the relay apparatus 100 includes a communication unit 110, a policy table 120, a connection management table 130, a request receiver 140, a connection controller 150, a session disconnecting processor 160, a session maintaining processor 170, and a policy editing unit 180.

The communication unit 110 communicates with the server, the client, and the operation management terminal via the LAN. The communication unit 110 transmits and receives packets such as message packets, and receives a request for establishing a TCP session.

Figure 3A:
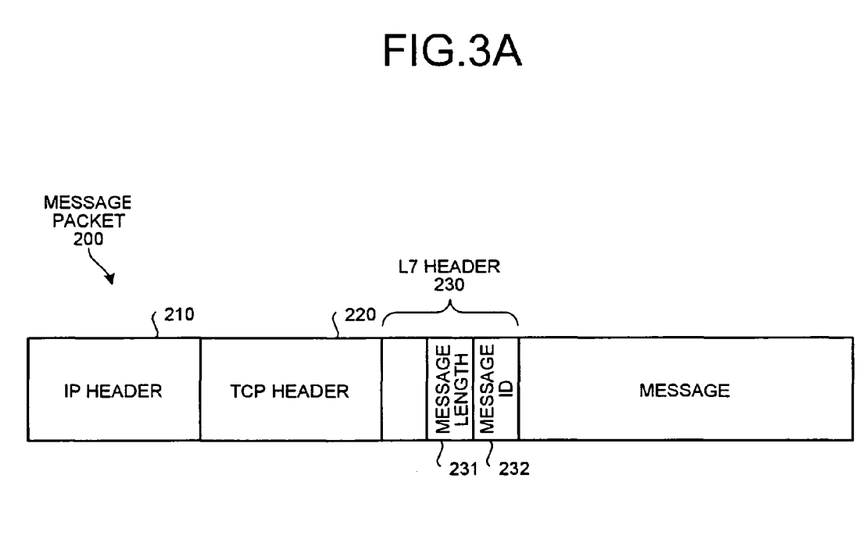
FIG. 3A is a schematic for illustrating a format of a message packet (a head)
Figure 3B:
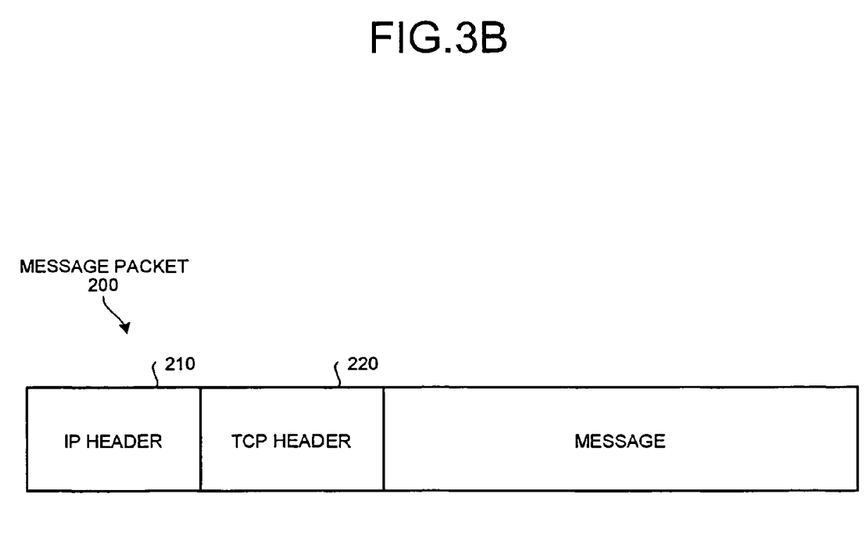
FIG. 3B is a schematic for illustrating a format of a message packet (a second item and after)

FIG. 3A and FIG. 3B are schematics for illustrating formats of a message packet transmitted and received by the communication unit 110. FIG. 3A illustrates a format of a message packet including a head of the message, and FIG. 3B illustrates a format of a message packet including a continuation part of the message.

As shown in FIG. 3A, a message packet 200 including the head of the message includes an internet protocol (IP) header 210, a TCP header 220, an L7 header 230, and a message. The IP header 210 is a header of an IP layer, and the TCP header 220 is a header of the TCP layer.

The L7 header 230 is a header of an application layer, and includes a message length 231 and a message ID 232. The message length 231 indicates a length of a message that can be transferred by being divided into message packets 200. The message ID 232 is an identifier for identifying the message.

As shown in FIG. 3B, the message packet 200 including the continuation part of the message includes the IP header 210, the TCP header 220, and the message.

The policy table 120 stores information specified by a user, such as information on a policy that is used for identifying a message or monitoring a packet. The policy table 120 includes a configuration-definition setting table 310 that stores an interface configuration, an allocation setting table 320 that stores information on allocation of packets, and a message identification table 330 that stores the policy.

Figure 4A:
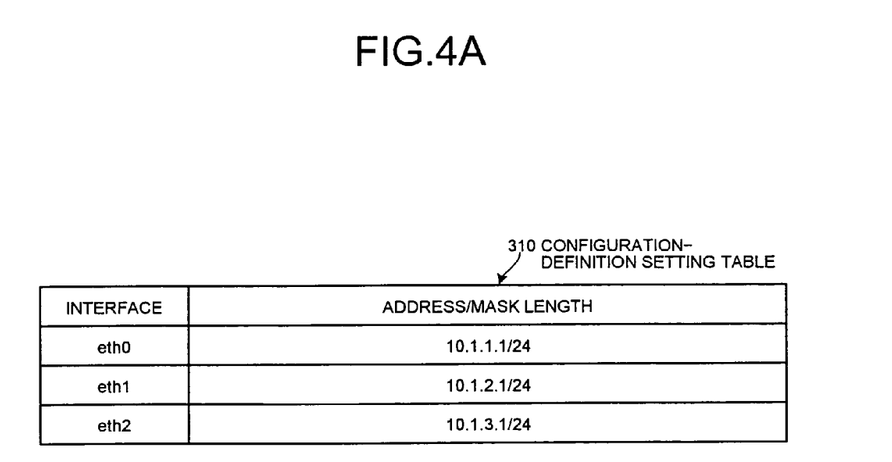
FIG. 4A is a configuration-definition setting table.

FIG. 4A illustrates an example of the configuration-definition setting table 310. As shown in FIG. 4A, the configuration-definition setting table 310 stores an IP address and a mask length correlating with an interface held by the relay apparatus 100.

Figure 4B:
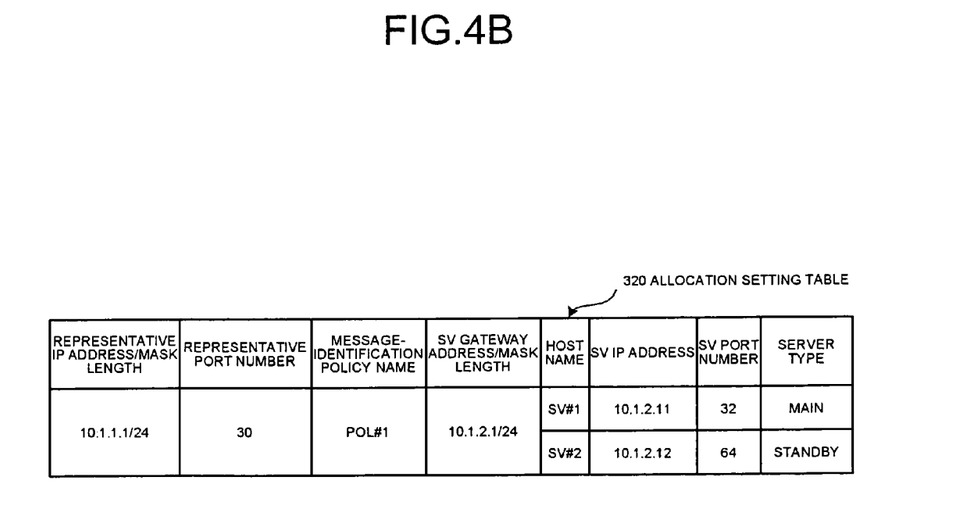
FIG. 4B is an allocation setting table.

FIG. 4B illustrates an example of the allocation setting table 320. As shown in FIG. 4B, the allocation setting table 320 includes information such as a representative IP address/mask length, a representative port number, a message-identification policy name, an SV gateway address/mask length, a host name, an SV IP address, an SV port number, and a server type.

The representative IP address/mask length indicates an IP address and a mask length that is used at the client when communicating with the server. The representative port number indicates a port number of a port used by the relay apparatus 100. The message-identification policy name indicates a policy number of a policy that is used to identify the message. The SV gateway address/mask length indicates an IP address and a mask length used to connect with the server. The host name indicates a name of the server that is used as the main server or the standby server. The SV IP address indicates an actual IP address of the server. The SV port number indicates a port number of a port actually used by a server application. The server type indicates which of the main server or the standby server is being used.

Figure 4C:
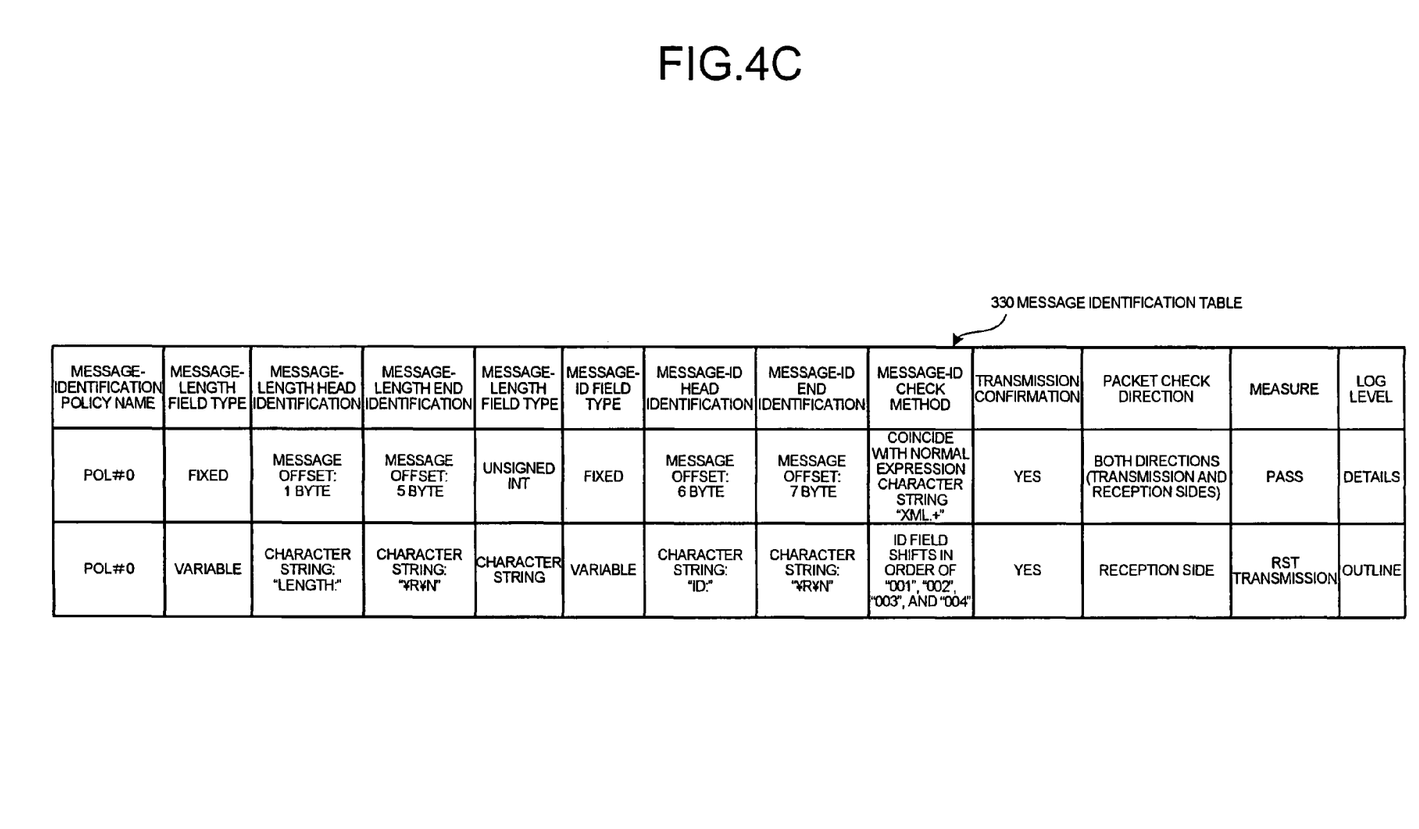
FIG. 4C is a message identification table.

FIG. 4C illustrates an example of the message identification table 330. As shown in FIG. 4C, the message identification table 330 includes a message-identification policy name, a message-length field type, a message length head identification, a message-length end identification, a message-length field type, a message-ID field type, a message-ID head identification, a message-ID end identification, a message-ID check method, a transmission confirmation, a packet check direction, a measure, and a log level.

The message-length field type indicates whether a field of the message length 231 in the message packet 200 is fixed or variable. The message length head identification indicates a method of identifying the head of the message length 231. For example, "message offset: 1 byte" indicates that a second byte from the head of the L7 header 230 is the head of the message length 231, and "character string: "Length:"" indicates that a byte that follows a character string "Length:" is the head of the message length 231.

The message-length end identification indicates a method of identifying an end of the message length 231. For example, "message offset: 5 byte" indicates that a fifth byte from the head of the L7 header 230 is the end of the message length 231, and "character string: "\r\n"" indicates that a part preceeding a character string "\r\n" is the end of the message length 231.

The message-length field type indicates a data type of the message length 231. For example, "unsigned int" indicates the unsigned integer type, and "character string" indicates a character string type.

The message-ID field type indicates whether the field of the message ID 232 in the message packet 200 is fixed or variable. The message-ID head identification indicates a method of identifying the head of the message ID 232. For example, "message offset: 6 byte" indicates that a sixth byte from the head of the L7 header 230 is the head of the message ID 232, and "character string: "ID:"" indicates that a byte that follows a character string "ID:" is the head of the message ID 232.

The message-ID end identification indicates a method of identifying the end of the message ID 232. For example, "message offset: 7 byte" indicates that a seventh byte from the head of the L7 header 230 is the end of the message ID 232, and "character string: "\r\n"" indicates that a part preceeding a character string "\r\n" is the end of the message ID 232.

The message-ID check method indicates a method of checking whether the message packet is transmitted in a correct order. For example, "coincides with normal expression character string "xml.+"" indicates that the message ID 232 is in a format of a normal expression character string of an extensible markup language (XML).

The transmission confirmation indicates whether reception of a packet is to be confirmed. For example, "yes" indicates that acknowledge is returned as the transmission confirmation. The packet check direction indicates which one of a transmission packet or a reception packet exchanged between the server and the client is to be checked. For example, "both directions" indicates that both the packet transmitted from the client to the server and the packet transmitted from the server to the client are checked.

The measure indicates a measure to be taken when there is abnormality in the message packet 200 that is received. For example, "pass" indicates that even when abnormality is found, the message packet is relayed as it is. The log level indicates a level of logs to be taken. For example, "details" indicates to take a detailed log.

Information necessary to extract the message length 231 and the message ID 232 from the message packet 200 and information necessary to check the message ID 232 are stored as a policy for each application in the message identification table 330. Thus, the relay apparatus 100 can properly determine whether the TCP session can be maintained for different applications.

Referring back to FIG. 2, the connection management table 130 stores for each TCP session, the information on the connection between the client and the server in which the TCP session is established.

Figure 5:
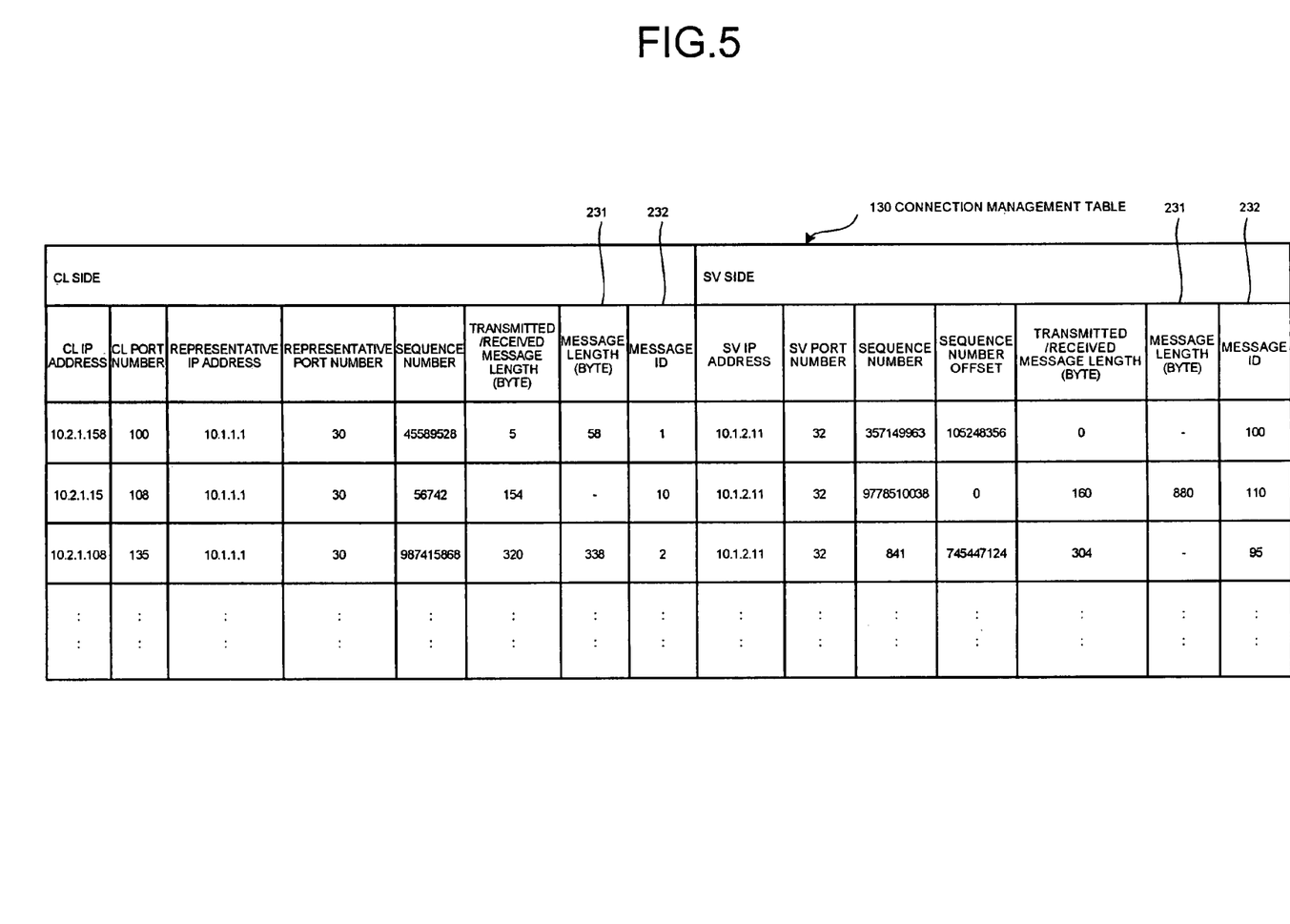
FIG. 5 is a connection management table.

FIG. 5 is an example of the connection management table 130. As shown in FIG. 5, the connection management table 130 stores for each TCP session, information on the client (CL) and information on the server (SV) correlated each other.

Specifically, the connection management table 130 stores an IP address, a port number, a representative IP address, a representative port number, a sequence number, a transmitted/received message length, the message length 231, and the message ID 232, as the information on the client. The connection management table 130 stores an IP address, a port number, a sequence number offset, a transmitted/received message length, the message length 231, and the message ID 232, as the information on the server.

The sequence number is a serial number that is attached to the packet. The transmitted/received message length is the length of a message that has been communicated from among messages. By comparing the transmitted/received message length with the message length 231 specified in the message packet 200 at the head, the relay apparatus 100 can determine whether the message is being communicated in each TCP session.

The sequence number offset is a difference between the sequence number of the packet that is transmitted by the standby server and the sequence number of the packet that is transmitted by the main server, when the working server is switched from the main server to the standby server. The sequence numbers of the packets received by the client before and after the switch should to be sequential without gaps. The relay apparatus 100 stores the sequence number offset for each TCP session, adds this sequence number offset to the sequence number of the packet transmitted by the standby server. A value that is obtained by adding the sequence number offset is transmitted to the client as the sequence number.

Referring back to FIG. 2, the request receiver 140 receives a request for establishing a TCP session from the client, and establishes a TCP session between the client and the relay apparatus 100, and between the relay apparatus 100 and the server. Furthermore, the request receiver 140 registers the IP addresses of the client and the server, the port number, the sequence number, and the like into the connection management table 130, for the TCP session established.

The connection controller 150 receives packets from the client and the server via the communication unit 110, and relays the packets. When receiving the message packet 200 that includes the head of a message, the connection controller 150 extracts the message length 231 and the message ID 232 from the message packet 200 based on the policy stored in the message identification table 330 to store in the connection management table 130.

When receiving the message packet 200, the connection controller 150 updates the transmitted/received message length in the connection management table 130, using the message length included in the message packet 200.

When a fault occurs in the main server, the connection controller 150 receives a notice of switch to the standby server from the operation management terminal via the communication unit 110. Upon receiving the notice, the connection controller 150 checks whether it is in the middle of relaying single message, for each TCP being established. For the TCP session in which single message is in the middle of being relayed, the connection controller 150 instructs the session disconnecting processor 160 to execute the session disconnecting processing. For the TCP session in which single message is not in the middle of being relayed, the connection controller 150 instructs the session maintaining processor 170 to execute the session maintaining processing.

The connection controller 150 determines whether single message is in the middle of being relayed by comparing the transmitted/received message length with the message length 231 in the connection management table 130.

Upon receiving the notice of switch, the connection controller 150 determines whether it is in the middle of relaying single message using the message length 231, for each TCP session established. For the TCP session in which single message is in the middle of being relayed, the connection controller 150 instructs for the session disconnecting processing. For the TCP session in which single message is not in the middle of being relayed, the connection controller 150 instructs for the session maintaining processing. Thus, the TCP session can be properly maintained or disconnected even for various applications.

The session disconnecting processor 160 performs a session disconnecting processing based on the instruction from the connection controller 150, when the working server is switched from the main server to the standby server. Specifically, the session disconnecting processor 160 transmits an RST packet to the main server and the client, thereby disconnecting the TCP session.

The session maintaining processor 170 performs a session maintaining processing based on the instruction from the connection controller 150, when the working server is switched from the main server to the standby server. Specifically, the session maintaining processor 170 transmits a RST packet to only the main server, thereby establishing the TCP session with the standby server.

The policy editing unit 180 edits the policy table 120 based on an instruction from the user. The user specifies the policy to be stored in the message identification table 330 to the policy editing unit 180 for each application, thereby making the relay apparatus 100 operate corresponding to various applications.

Figure 6:
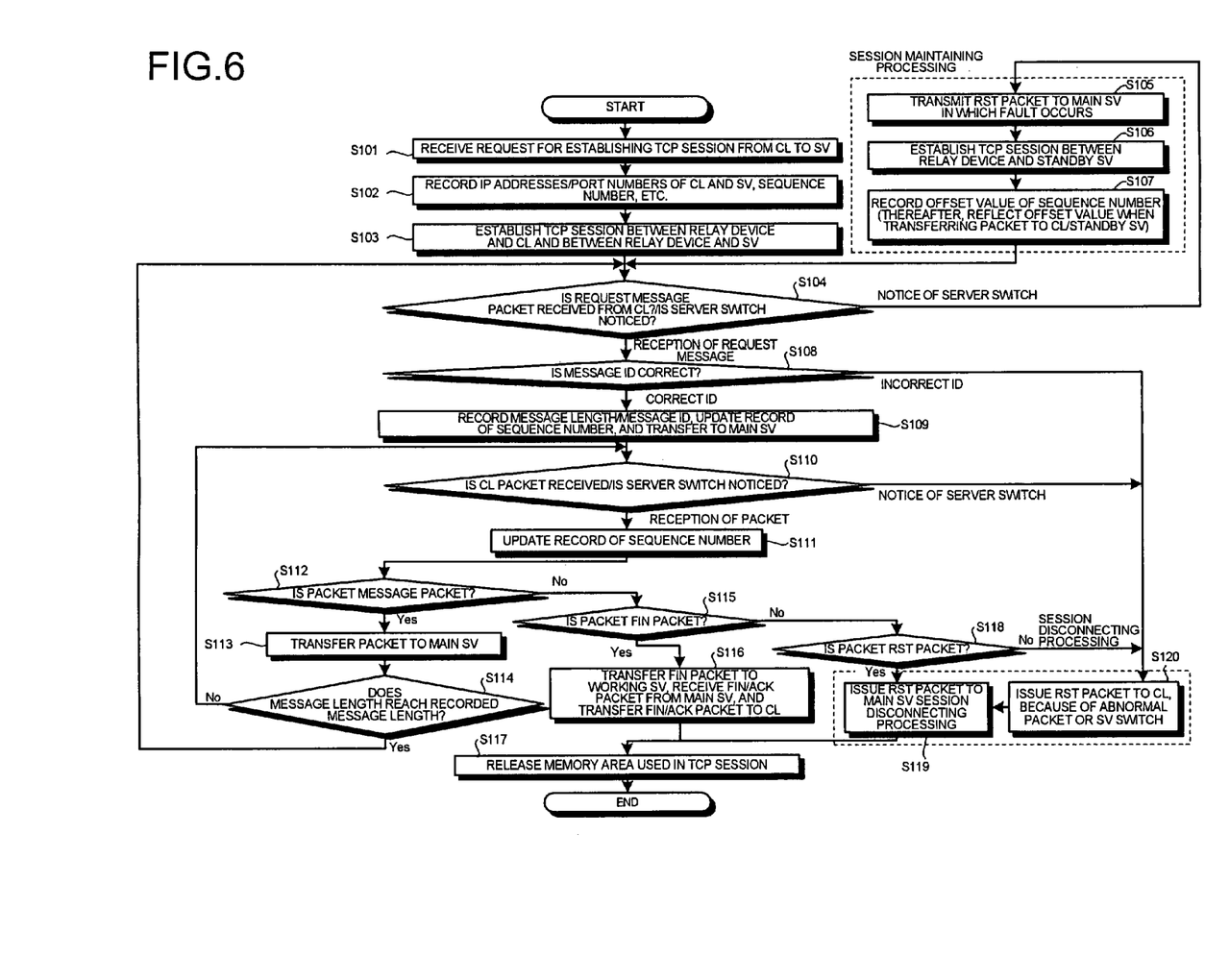
FIG. 6 is a flowchart of a relay processing performed by the relay apparatus.

FIG. 6 is a flowchart of the relay processing performed by the relay apparatus 100. Transmission of a request message from the client to the server is explained as an example.

As shown in FIG. 6, when the relay apparatus 100 receives a request for establishing a TCP session from the client (CL) to the server (SV) (step S101), the request receiver 140 records IP addresses of the client and the server, a port number, a sequence number, and the like in the connection management table 130 (step S102), and establishes a TCP session between the relay apparatus 100 and the client, and between the relay apparatus 100 and the main server respectively (step S103).

The connection controller 150 waits for a server switching notice of an instruction to switch the working server from the main server to the standby server or the message packet 200 of the request message. When receiving the server switching notice from the operation management terminal (step S104: NOTICE OF SERVER SWITCH), the connection controller 150 determines that it is not in the middle of relaying single message, and instructs the session maintaining processor 170 to maintain the session.

Specifically, the session maintaining processor 170 transmits the RST packet to the main server in which a fault occurs (step S105), and establishes a TCP session between the relay apparatus 100 and the standby server (step S106). The session maintaining processor 170 calculates an offset value of a sequence number based on the sequence number transmitted from the standby server, and records the offset value calculated in the connection management table 130 as a sequence number offset (step S107). This sequence number offset is reflected in the sequence number of the packet transferred to the client thereafter.

Upon receiving the message packet 200 of the request message from the client (step S104: RECEPTION OF REQUEST MESSAGE), the connection controller 150 determines whether the message ID 232 is correct based on the message-ID check method stored in the message identification table 330 (step S108). When the message ID 232 is correct, the connection controller 150 records the message length 231 and the message ID 232 into the connection management table 130, updates the record of the sequence number, and transfers the message packet 200 to the main server (step S109).

The connection controller 150 waits for a packet from the client or the server switching notice from the operation management terminal. Upon receiving a packet (step S110: RECEPTION OF PACKET), the connection controller 150 updates the record of the sequence number (step S111), and determines whether the packet is the message packet 200 (step S112).

When the packet is the message packet 200, the connection controller 150 transfers the packet to the main server (step S113), calculates the length of the message relayed, and updates transmitted/received message length in the connection management table 130. The connection controller 150 determines whether the transmitted/received message length reaches the message length 231 recorded in the connection management table 130 (step S114). When the transmitted/received message length does not reach the message length 231, the process returns to step S110, and the connection controller 150 waits for a next one of the message packet 200. When the transmitted/received message length reaches the message length 231, the relay of one request message is completed, and the process returns to step S104.

On the other hand, when the packet is not the message packet 200, the connection controller 150 determines whether the packet is an FIN packet (step S115). When the packet is the FIN packet, the connection controller 150 transfers the FIN packet to the main server, receives a FIN/ACK packet from the main server, and transfers the FIN/ACK packet to the client (step S116). The connection controller 150 releases a memory area used in this TCP session, and completes the TCP session (step S117).

When the packet is not the FIN packet, the connection controller 150 determines whether the packet is the RST packet (step S118). When the packet is the RST packet, the connection controller 150 issues the RST packet to the main server (step S119), releases the memory area used in this TCP session, and disconnects the TCP session (step S117).

When the packet is not the RST packet, the packet is an abnormal packet. Therefore, the connection controller 150 instructs the session disconnecting processor 160 to disconnect the session. That is, the session disconnecting processor 160 issues the RST packet to the client and the main server respectively (step S120 and step S119), releases the memory area used in this TCP session, and disconnects the TCP session (step S117).

Upon receiving the server switching notice at step S110, the connection controller 150 determines that single message is in the middle of being relayed, and instructs the session disconnecting processor 160 to disconnect the session.

When the message ID 232 is not correct as a result of the determination at step S108, the packet is an abnormal packet, and therefore, the connection controller 150 instructs the session disconnecting processor 160 to disconnect the session.

As explained above, upon receiving the server switching notice, the connection controller 150 determines whether it is not in the middle of relaying single message. When it is not in the middle of relaying single message, the connection controller 150 instructs the session maintaining processor 170 to maintain the session. When it is in the middle of relaying single message, the connection controller 150 instructs the session disconnecting processor 160 to disconnect the session. Therefore, the connection controller 150 can properly maintain or disconnect the TCP session, thereby switching the working server to the standby server.

The processing in which the server receives a request message from the client is explained above. For the processing of receiving a response message from the server, the client receives the response message from the server at step S104. At step S108 to step S120, the processing is performed by replacing the client with the main server.

Figure 7:
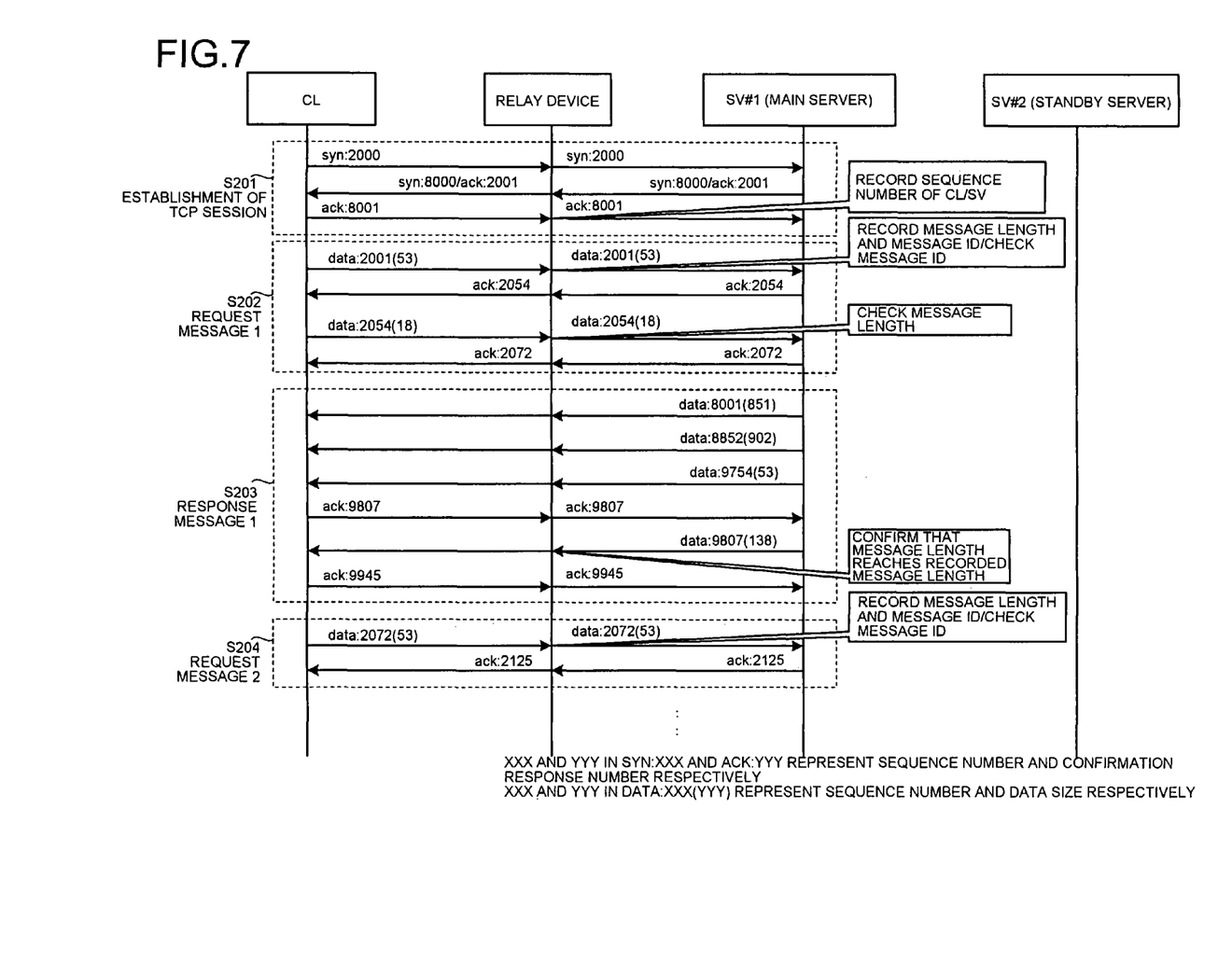
FIG. 7 is a sequence diagram of a communication processing between a client (CL) and a server (SV) (during a normal time)

FIG. 7 is a sequence diagram of a communication processing between the client and the server during normal operation. As shown in FIG. 7, the client first requests for the establishment of a TCP session (step S201). Specifically, the client transmits a syn packet of a sequence number "2000" to a main server "SV#1", and the main server transmits a syn packet of a sequence number "8000" and an ack packet of a confirmation response number "2001" to the client. The client transmits an ack packet of a confirmation response number "8001" to the main server, thereby establishing a TCP session. In this case, the relay apparatus 100 records sequence numbers of packets transmitted by the client and the main server.

The client transmits a message "request message 1" to the server (step S202). Specifically, the client transmits a data packet of a sequence number "2001" having a length of 53 bytes and a data packet of a sequence number "2054" having a length of 18 bytes to the server. The server transmits ack packets having confirmation response numbers "2054" and "2072" as a response respectively to the client. The data packet is the message packet 200. The "request message 1" includes two pieces of the message packets 200.

When relaying first one of the message packet 200, the relay apparatus 100 records the message length 231 and the message ID 232 into the connection management table 130, and checks the message ID 232. When relaying a second one of the message packet 200, the relay apparatus 100 checks the message length 231, thereby confirming that the relay of the "request message 1" is completed.

The server transmits the message "response message 1" to the client (step S203). Specifically, the server transmits the "response message 1" using four data packets. In relaying a fourth one of the message packet 200, the relay apparatus 100 checks the message length 231 of the "response message 1", thereby recognizing that the relay of the "response message 1" is completed.

Thereafter, the transmission of a request message from the client and the transmission of a response message from the server are repeated in a similar manner. Finally, the client transmits the FIN packet to the server. The server transmits the ack packet as a response, and the TCP session ends.

Figure 8:
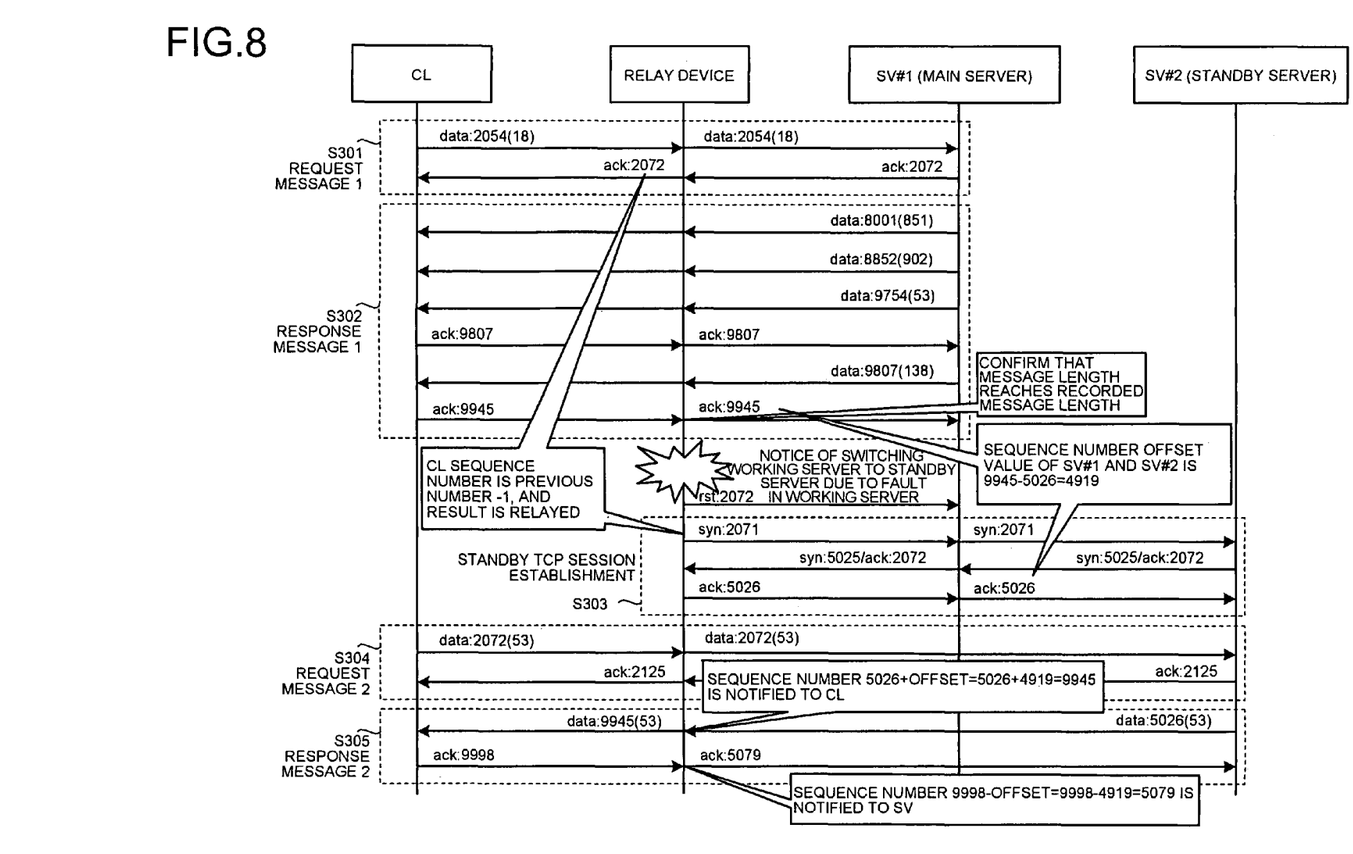
FIG. 8 is a sequence diagram of a communication processing between the CL and the SV (when a session can be maintained)

FIG. 8 is a sequence diagram of a communication processing between the client and the server when a session can be maintained. As shown in FIG. 8, the client transmits the message "request message 1" to the server (step S301), and the server transmits the message "response message 1" to the client (step S302).

When a fault occurs in the main server before the client transmits a next message "request message 2", the relay apparatus 100 determines that the TCP session can be maintained. The relay apparatus 100 maintains the session since the server is switched to the standby server after a relay of the "response message 1" is completed and before a relay of the "request message 2" is started.

In other words, the relay apparatus 100 transmits an RST packet (rst: 2072) to the main server, and establishes a TCP session between the relay apparatus 100 and the standby server (step S303). In this case, the relay apparatus 100 subtracts a confirmation response number "5026" to the standby server from a confirmation response number "9945" from the client to the main server, thereby calculating the offset value of the sequence number. The offset value calculated is stored in the connection management table 130 as the sequence number offset.

For the packet transmitted from the standby server to the client, the relay apparatus 100 adds the offset value of this sequence number to the sequence number, and transmits the packet to the client. For the response packet transmitted from the client to the standby server, the relay apparatus 100 subtracts the offset value of this sequence number from the sequence number, and transmits the packet to the standby server.

As explained above, based on the length of the message relayed, the relay apparatus 100 determines that the switch to the standby server is carried out between processes of a relay of the request message and the relay of the response message. Consequently, the relay apparatus 100 can properly determine, without depending on the application, that the TCP session can be maintained.

Regarding the packet that the relay apparatus 100 relays for the message that is transmitted from the standby server to the client after the relay apparatus 100 calculates the offset value of the sequence number when a TCP session is established between the relay apparatus 100 and the standby server, the relay apparatus 100 corrects the sequence number using the offset value. Thus, the client can receive the response message having a continuous sequence number even after the server is switched to the standby server.

Figure 9:
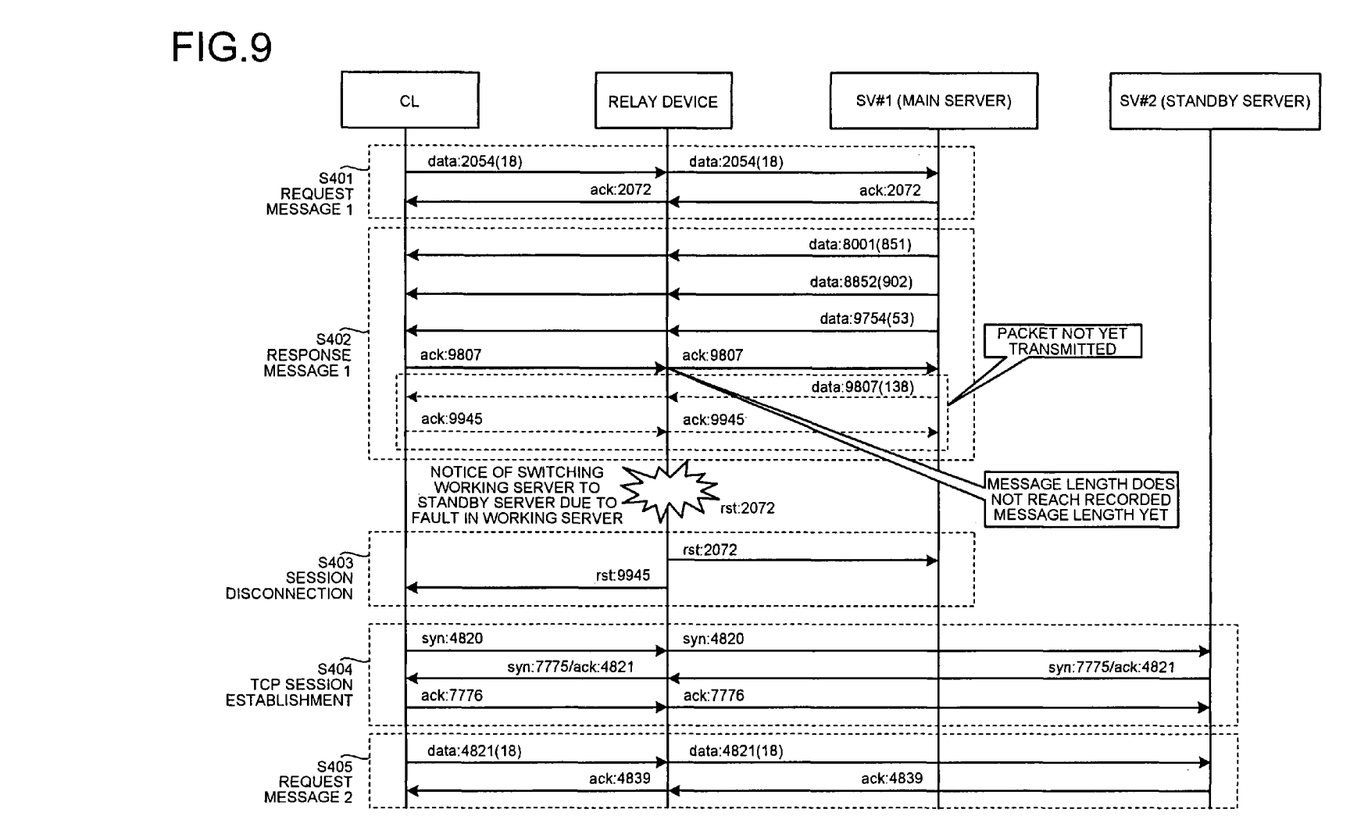
FIG. 9 is a sequence diagram of a communication processing between the CL and the SV (when a session cannot be maintained)

FIG. 9 is a sequence diagram of a communication processing between the client and the server when a session cannot be maintained. The sequence after the session is established is explained, like the sequence explained with reference to FIG. 8. As shown in FIG. 9, the client transmits the message "request message 1" to the server (step S401), and the server transmits the message "response message 1" to the client (step S402).

In this case, a fault occurs in the main server before the relay apparatus 100 relays a fourth data packet. Based on the length of the message relayed, the relay apparatus 100 determines that the server is switched to the standby server in the middle of relaying the "response message 1", and disconnects the session (step S403).

In other words, the relay apparatus 100 transmits an RST packet to the main server and the client respectively, and disconnects the TCP session. Thereafter, when the client requests for establishing a new TCP session with the server, the relay apparatus 100 establishes a TCP session with the standby server (step S404). When the TCP session is established, the client transmits the next message "request message 2" to the server (step S405).

As explained above, based on the length of the message relayed, the relay apparatus 100 determines that the switch to the standby server is carried out in the middle of relaying the response message. Consequently, the relay apparatus 100 can properly determine, without depending on the application, that the TCP session cannot be maintained.

As described above, according to the present embodiment, the connection controller 150 of the relay apparatus 100 extracts the message length 231 and the message ID 232 from the message packet 200 including the head of the message based on the policy stored in the policy table 120 to record in the connection management table 130. When a fault occurs in the main server, the connection controller 150 determines whether it is in the middle of relaying single message, based on the length of the message relayed and the message length 231 in the connection management table 130. When it is in the middle of relaying single message, the connection controller 150 instructs the session disconnecting processor 160 to disconnect the session. When it is not in the middle of relaying single message, the connection controller 150 instructs the session maintaining processor 170 to maintain the session. Therefore, the TCP session can be maintained or disconnected properly without depending on the application, thereby switching the working server from the main server to the standby server.

Moreover, according to the present embodiment, the connection controller 150 determines whether the packet relayed is an abnormal packet based on the message ID 232 in the connection management table 130. When the packet relayed is an abnormal packet, the connection controller 150 instructs the session disconnecting processor 160 to disconnect the session. Therefore, it is possible to detect abnormality in the communication between the client and the server at a TCP layer level without depending on the application, and is possible to perform a proper fault recovery processing.

Furthermore, according to the present embodiment, the communication between the client and the server is relayed at the TCP layer level instead of the application layer level. Therefore, a load on the relay processing can be reduced compared to the load on the relay processing at the application layer level.

The relay apparatus 100 is explained in the present embodiment. When the configuration of the relay apparatus 100 is realized using software, a relay program having a similar function can be obtained.

Figure 10:
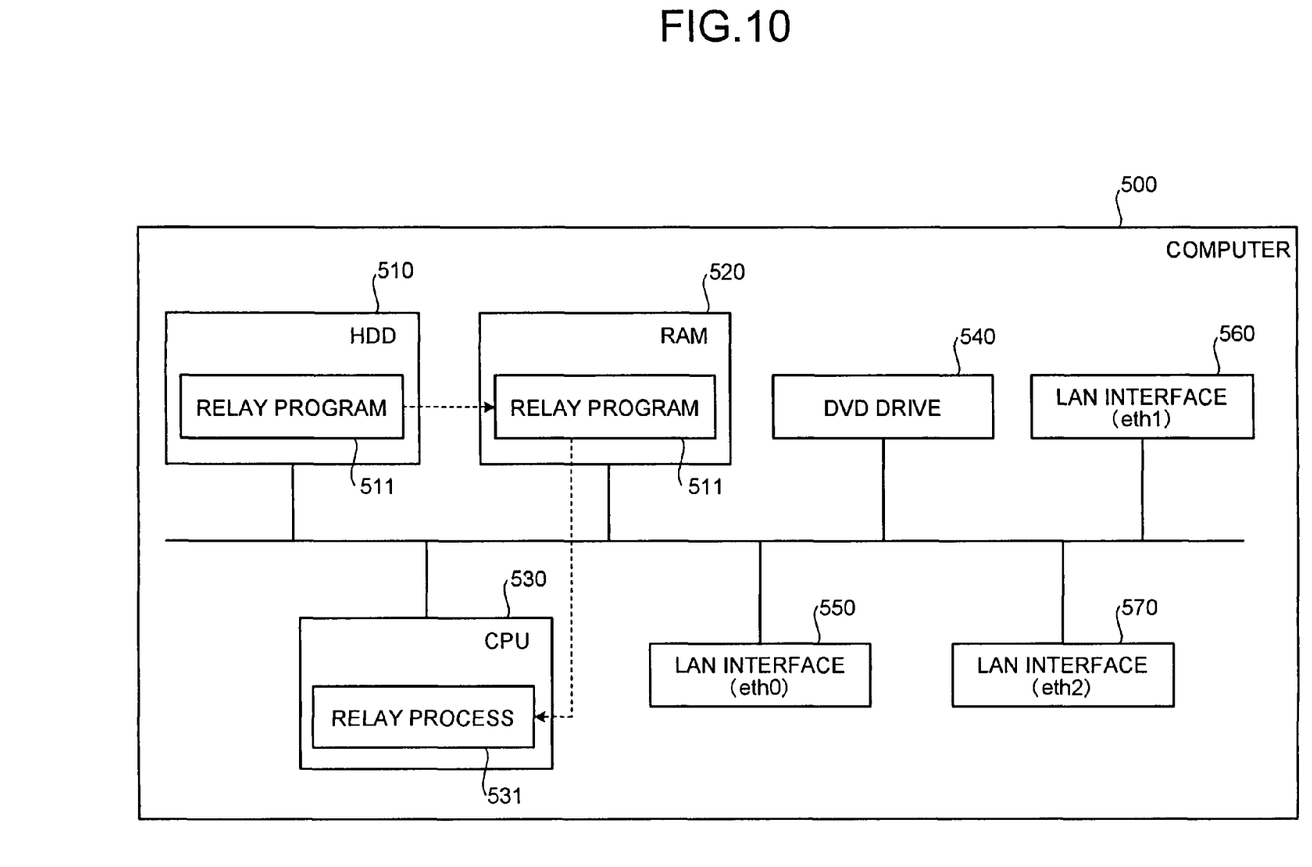
FIG. 10 is a block diagram of a computer that executes a relay program according to an embodiment of the present embodiment.

FIG. 10 is a block diagram of a computer that executes the relay program according to the present embodiment. As shown in FIG. 10, a computer 500 includes a hard disk drive (HDD) 510, a random access memory (RAM) 520, a central processing unit (CPU) 530, a digital versatile disk (DVD) 540, and LAN interfaces 550 to 570.

The HDD 510 stores a relay program 511. The RAM 520 is a memory that stores the relay program 511 read from the HDD 510 by the CPU 530, and an intermediate result of execution of the relay program 511.

The CPU 530 reads a program from the HDD 510 to the RAM 520, and executes the program. The DVD drive 540 reads the DVD. The LAN interfaces 550 to 570 connect the computer 500 to the LAN 1, the LAN 2, and the LAN 3.

The relay program 511 executed by the computer 500 is stored in the DVD. The DVD drive 540 reads the relay program 511 from the DVD, and installs the relay program in the computer 500.

Alternatively, the relay program 511 is stored into a database of other computer systems connected via the LAN interfaces 550 to 570. The relay program is read from these databases, and is installed in the computer 500.

The relay program 511 installed is stored in the HDD 510, and is then read out by the RAM 520. The CPU 530 executes this program as a relay process 531.

While the processing when a fault occurs in the server is explained in the present embodiment, the present invention is not limited to this. The invention can be similarly applied to the processing when a fault occurs in a working relay apparatus and this relay apparatus is switched to a standby relay apparatus.

In other words, when a fault occurs in the working relay apparatus, the standby relay apparatus determines whether it is in the middle of relaying single message, for each TCP session. When it is in the middle of relaying single message, the standby relay apparatus executes a processing for disconnecting the TCP session. When it is not in the middle of relaying single message, the standby relay apparatus executes a processing for maintaining the TCP session.

According to the present invention, it is possible to perform a general fault recovery processing without depending on an application.

Moreover, according to the present invention, it is not necessary to develop a fault recovery processing for each application.

Furthermore, according to the present invention, it is possible to determine whether connection can be maintained without depending on an application.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A computer-readable non-transitory recording medium that stores a relay program for relaying a communication between a client and a server, the relay program making a computer execute:
monitoring packets communicated between the client and the server for each TCP session;
determining, using information extracted from the packets monitored, whether a TCP session established between the server and the client may be maintained without depending on an application once the server is to be switched to a standby server, wherein the determining includes,
determining whether the TCP session may be maintained or not, without depending on the application once the server is to be switched to the standby server, based on a policy, the policy differing from one application to another and including information necessary for extracting a length and an identifier of a message from a packet; and
executing a process depending on a result of determination at the determining, wherein
the process includes
maintaining the TCP session once it is determined that the TCP session may be maintained; and
disconnecting the TCP session once it is determined that the TCP session may not be maintained.

2. The computer-readable non-transitory recording medium according to claim 1, wherein the relay program further makes the computer execute editing the policy.

3. The computer-readable non-transitory recording medium according to claim 1, wherein the maintaining includes maintaining the TCP session while guaranteeing that sequence numbers of packets transmitted from the server keeps a continuous series before and after a switch of the server to the standby server.

4. A computer-readable non-transitory recording medium that stores a relay program for a relay apparatus that relays a communication between a client and a server, the relay apparatus including a first computer currently activated and a second computer being an alternative computer once the first computer becomes inactivated, the relay program making the second computer execute:
monitoring packets communicated between the client and the server for each TCP session;
determining, using information extracted from the packets monitored, whether a TCP session established between the server and the client may be maintained without depending on an application once the first computer is to be switched to the second computer, wherein the determining includes,
    determining whether the TCP session may be maintained or not, without depending on the application once the first computer is to be switched to the second computer, based on a policy, the policy differing from one application to another and including information necessary for extracting a length and an identifier of a message from a packet; and
executing a process depending on a result of determination at the determining, wherein
the process includes
    maintaining the TCP session once it is determined that the TCP session may be maintained; and
    disconnecting the TCP session once it is determined that the TCP session may not be maintained.

5. A relay method for relaying a communication between a client and a server, comprising:
    monitoring packets communicated between the client and the server for each TCP session;
    determining, using a central processing unit of a computer and information extracted from the packets monitored, whether a TCP session established between the server and the client may be maintained without depending on an application once the server is to be switched to a standby server, wherein the determining includes,
        determining whether the TCP session may be maintained or not, without depending on the application once the server is to be switched to the standby server, based on a policy, the policy differing from one application to another and including information necessary for extracting a length and an identifier of a message from a packet; and
    executing a process depending on a result of determination at the determining, wherein
    the process includes
        maintaining the TCP session once it is determined that the TCP session may be maintained; and
        disconnecting the TCP session once it is determined that the TCP session may not be maintained.

6. The relay method according to claim 5, further comprising editing the policy.

7. The relay method according to claim 5, wherein the maintaining includes maintaining the TCP session while guaranteeing that sequence numbers of packets transmitted from the server keeps a continuous series before and after a switch of the server to the standby server.

8. An apparatus comprising:
    a processor; and
    a memory storing computer-readable instructions, execution of the instructions by the processor facilitates relaying a communication between a client and a server, execution of the instructions by the processor configuring the apparatus to include:
    a monitoring unit to monitor packets communicated between the client and the server for each TCP session;
    a determining unit to determine, using information extracted from the packets monitored, whether a TCP session established between the server and the client may be maintained without depending on an application once the server is to be switched to a standby server, wherein the determining unit to determine whether the TCP session may be maintained or not, without depending on the application once the server is to be switched to the standby server, based on a policy, the policy differing from one application to another and including information necessary for extracting a length and an identifier of a message from a packet; and
    an executing unit to execute a process depending on a result of determination by the determining unit, wherein
    the process includes
        a maintaining process to maintain the TCP session once the determining unit determines that the TCP session may be maintained; and
        a disconnecting process to disconnect the TCP session once the determining unit determines that the TCP session may not be maintained.

9. The apparatus according to claim 8, further comprising an editing unit that edits the policy.

10. The relay apparatus according to claim 8, wherein in the maintaining process, the TCP session is maintained while the executing unit guaranteeing that sequence numbers of packets transmitted from the server keeps a continuous series before and after a switch of the server to the standby server.

\* \* \* \* \*